C. DE LEON.
TEAT CUP FOR MILKING MACHINES.
APPLICATION FILED OCT. 22, 1914.
1,184,632.
Patented May 23, 1916.
2 SHEETS—SHEET 2.
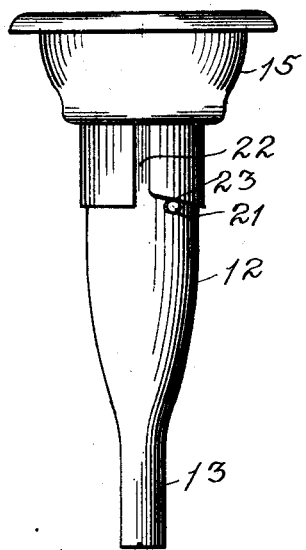
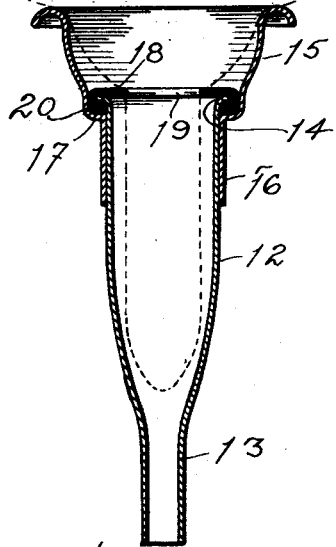
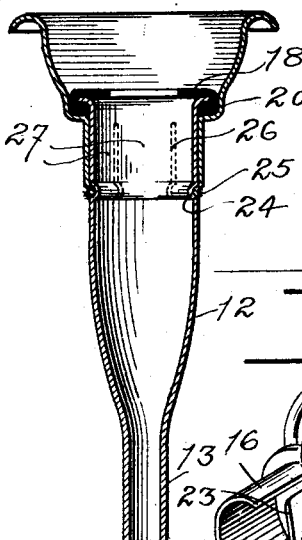
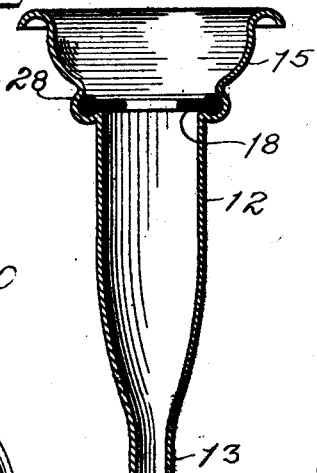
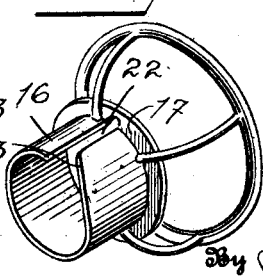

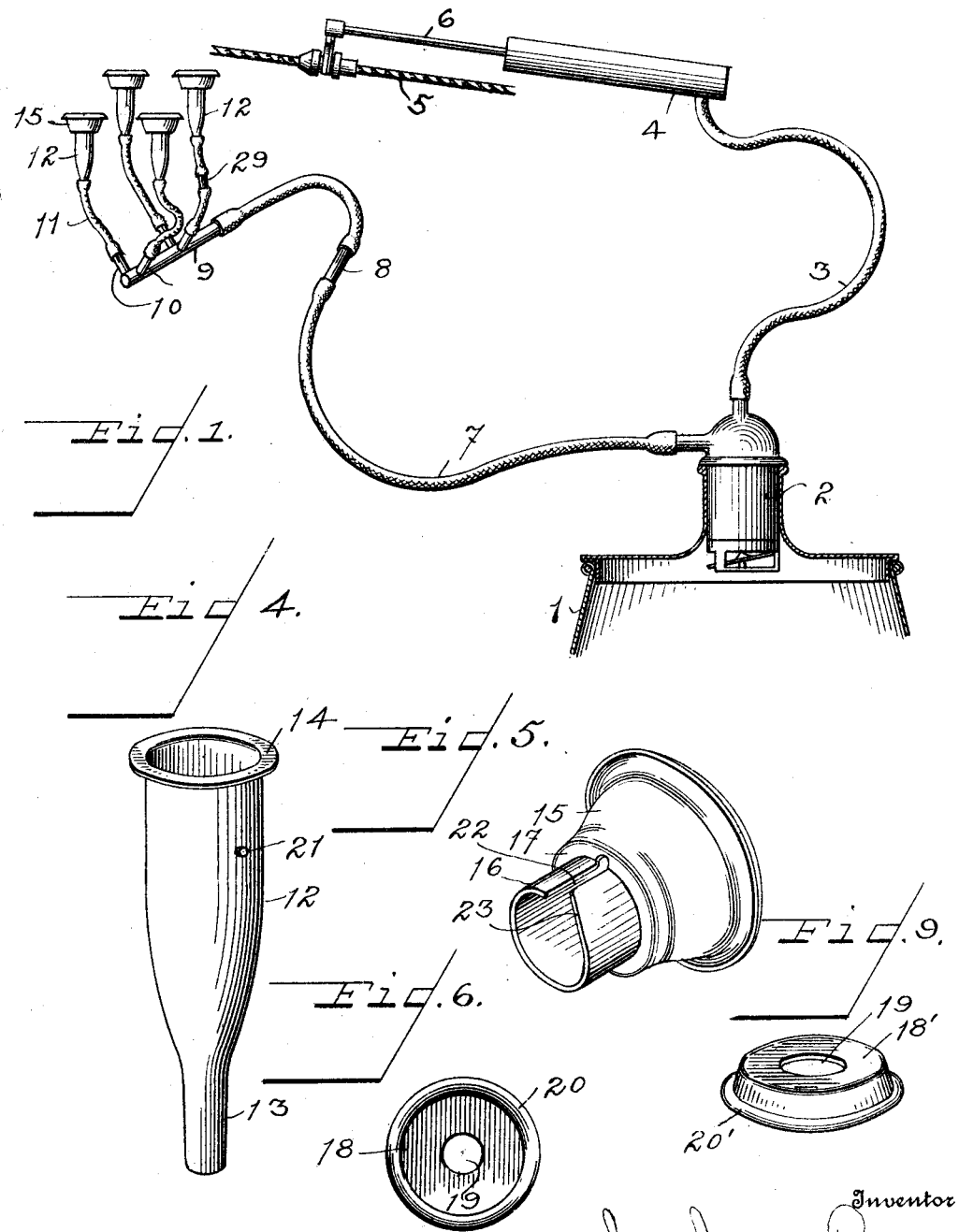

UNITED STATES PATENT OFFICE.

CARLOS DE LEON, OF DAYTON, OHIO, ASSIGNOR, BY MESNE ASSIGNMENTS, TO N. D. RUTHERFORD.

TEAT-CUP FOR MILKING-MACHINES.

1,184,632. Specification of Letters Patent. Patented May 23, 1916.

Application filed October 22, 1914. Serial No. 868,147.

*To all whom it may concern:*

Be it known that I, CARLOS DE LEON, a citizen of the United States, residing at Dayton, in the county of Montgomery and State of Ohio, have invented certain new and useful Improvements in Teat-Cups for Milking-Machines, of which the following is a specification.

My invention relates to milking apparatus and particularly to teat cups or udder attachments therefor.

The object of the invention is to simplify the structure as well as the means and mode of operation of such devices whereby they will not only be cheapened in construction, but will be more efficient in use, easily applied, easy and comfortable upon the animal, readily cleansed, and unlikely to get out of repair.

A further object of the invention is to provide such a device possessing no inaccessible places or shoulders or obstructions which might afford lodgment for bacteria or foreign matter but which will possess a continuous unbroken surface and which may be easily and readily separated into its component parts for cleansing purposes.

A further object of the invention is to provide a teat cup of such shape that pressure may be applied to the udder throughout a region surrounding the teat but removed therefrom.

With the above primary and other incidental objects in view, as will more fully appear in the specification, the invention consists of the features of construction, the parts and combinations thereof, and the mode of operation, or their equivalents, as hereinafter described and set forth in the claims.

Referring to the drawings, Figure 1 is a general view of an assembled milking apparatus. Fig. 2 is a side elevation of the assembled teat cup. Fig. 3 is a vertical sectional view thereof. Figs. 4, 5, and 6 are detail views of the component parts of the teat cup separated one from the other. Figs. 7 and 8 are vertical sectional views of modifications of the teat cup. Fig. 9 is a perspective view of a modification of the diaphragm. Fig. 10 is a modification in which the extension head is skeletonized.

Like parts are indicated by similar characters of reference throughout the several views.

In the drawings, 1 is the receptacle or pail in which the milk is collected on the cover of which is detachably supported the vacuum chamber or valved suction chamber 2. The suction chamber 2 is connected by a flexible conduit or hose 3 with the pump 4 by which the air is exhausted from the vacuum chamber 2. The pump 4 may be operated by hand or by power applied in any suitable and well known manner. The pump is preferably, though not necessarily, operated by the to and fro movement of a flexible reciprocatory cable 5 to which the piston 6 of the pump is detachably connected.

The driving connection of the pump and the vacuum chamber 2 form no part of the present invention and will not be herein described. The parts, however, are fully described and claimed in my co-pending applications, Serial No. 864,507, and Serial No. 862,780, to which reference is made for detailed description of the construction and operation of these parts.

Leading to the vacuum chamber 2 is the flexible supply conduit 7 which may be of rubber, fabric, or other suitable material, but which is preferably a flexible metallic conduit such as are now in common use. Located intermediate the ends of the conduit 7 is an interposed section 8 of transparent material such as glass, celluloid, or similar material, through which the flow of milk can be observed. Carried at the extremity of the conduit 7 is the claw or cluster, commonly employed, in milking apparatus, which comprises a main tubular conduit 9 provided with a plurality of branch conduits or nipples 10. Connected with each of the branch conduits or nipples 10 by a short length 11 of flexible conduit are the teat cups forming the subject matter hereof.

Each teat cup comprises a cylindrical tapered tubular member 12, the taper of which is somewhat arcuate, giving to it a cigar shaped contour which forms the teat cup proper. This member is provided with a contracted tubular extension 13 at one end with which the short conduit 11 engages and at the opposite end is provided with a flaring or outwardly projecting collar or flange 14.

A flaring funnel-like extension head 15 is provided for the tubular member 12. This head member is provided with a rounded bearing or top edge of much greater diameter than the tubular member 12 which is adapted to engage and support the udder adjacent to the teat. The support afforded by the extension top prevents broken blood vessels in the udder, and, by applying light pressure to the udder during the milking operation, induces a better flow of milk and produces a cleaner evacuation of the milk glands. The flaring or extension head 15 is provided with a contracted neck portion 16 adapted to inclose the tubular member 12. Adjacent to the neck portion it is provided with a seat 17. When the parts are assembled the flaring flange or collar 14 of the tubular member 12 overhangs the seat portion 17 of the flaring or extension head. A flexible diaphragm 18 of rubber or similar material provided with a central orifice 19 for the introduction of the teat is contracted over the flanged upper end of the tubular member 12. The diaphragm 18 is preferably provided with a beaded or reinforced peripheral edge 20 which contracts upon the tubular member 12 immediately below the flange or collar 14 thereof while the diaphragm overlies the upper edge of the member 12. With the diaphragm thus engaged upon the member 12 the said member is introduced through the neck portion of the extension head 14 and is drawn down tightly upon the seat 17 thereof. This compresses the peripheral margin of the diaphragm between the flaring flange 14 of the member 12 and the seat 17 of the extension head, thus forming a hermetically sealed joint.

Any suitable or convenient means may be employed for adjusting the head and teat cup and retaining them in adjusted position. In the drawings a convenient and efficient form of adjusting means is shown comprising a stud or projection 21 on the side of the teat cup and a slot 22 in the neck portion of the extension head which permits the member 12 and stud to pass therethrough. The lower edge of the neck of the flaring extension head is beveled or inclined as at 23. A rotary movement of the flaring head and the member 12 causes the inclined or beveled edge 23 to engage the stud 22 thereby forcing the member 12 downward through the flaring head and compressing the marginal bead 20 of the diaphragm between the flange 14 and the seat 17.

In Fig. 7 there is shown a modification of this construction in which the tubular member 12 is provided with a peripheral groove 24 and the neck of the flaring head is provided with a terminal bead 25 adapted to engage the groove 24 when the parts are in their adjusted position. In this construction the neck portion of the flaring head is slotted longitudinally, as shown at 26, to provide a plurality of resilient fingers 27 to facilitate the engagement or disengagement of the parts.

In Fig. 8 there is shown a modification of the construction before described in which the teat cup or tubular portion 12 and the flaring head portion are integral. The general contour of the parts and their operation are the same as before described. The seat or offset portion of the extension head in this construction is preferably slightly recessed or undercut, as shown at 28, into which the margin of the diaphragm is permitted to expand to retain it in position. When in operation the suction or vacuum produced by the pump 4 will draw the diaphragm firmly upon its seat to form an air-tight joint.

If so desired, a transparent section similar to the section 8 may be interposed in each of the flexible conduits 11, as indicated at 29, thereby enabling the flow of milk from each individual teat cup to be observed.

A flat diaphragm or one occupying a common plane throughout has been found highly efficient, and when expanded over the top of the tubular member 12 will maintain its position with the marginal portion contracted beneath the flange and the central portion overlying the flange. If so desired a concave diaphragm of flexible material, such as is shown in detail in Fig. 9, may be employed.

The tubular member 12 and the extension head 14 are preferably formed from non-corrosive metal such as German silver, aluminum, or some of the other alloyed metals, but may also be made of glass. When constructed from metal the parts are preferably made from sheet metal by a process of spinning but it is obvious that such parts may be made by stamping in dies or by other well known procedures. It is to be noted that the parts are easily separable one from the other and that the parts present smooth continuous surfaces affording no place for lodgment of bacteria or foreign material.

From the above description it will be apparent that there is thus provided a device of the character described, possessing the particular features of advantage before enumerated as desirable but which obviously is susceptible of modification in its form, proportion, detail construction or arrangement of parts, without departing from the principle involved or sacrificing any of its advantages.

While in order to comply with the statute the invention has been described in language more or less specific as to certain structural features, it is to be understood that the invention is not limited to any specific details but that the means and construction herein described comprise but one mode of putting the invention into effect, and the invention is therefore claimed broadly in any of its possible forms or modifications within the scope of the appended claims.

Having thus described my invention, I claim:

1. In a milking apparatus, a teat cup comprising a tubular inclosure for the teat, and an extension from the tube having an outturned widened peripheral supporting portion engaging the udder in a region surrounding the teat, the said cup having its internal surface concavely curved away from the axis of said portion, so as to lie wholly offset or spaced from and out of engagement with the neck of the teat between said teat and the body of the udder.

2. In a milking apparatus, a teat cup comprising a tubular inclosure for the teat, and a distended head carried by said tubular inclosure and arranged to surround the neck of the teat in spaced relation thereto between the body of the teat and body of the udder, and having an out-turned peripheral portion to engage and support the udder in a region surrounding the neck portion of the teat.

3. In a milking apparatus, a teat cup comprising a tubular inclosure for the teat, and a distended head carried by said closure to surround the neck of the teat, said head having an out-turned peripheral portion providing a convex surface of material width to engage and support the udder in the region surrounding the neck of the teat.

4. In a milking apparatus, a tubular receiver, a flaring bearing head of greater diameter than the receiver, said receiver and bearing head being formed to provide clamping portions at their points of juncture, and a perforated disk extending across the upper end of the receiver and peripherally held by said clamping portions, the head being provided at its upper edge with a peripheral flange to bear upon the udder and being curved or offset outwardly between said bearing portion and said washer so as to lie wholly out of contact with the neck of the teat.

5. In a milking apparatus, a teat cup comprising a tubular receiver having an annular bearing head of greater diameter than said receiver, said receiver head being provided with a receiving channel at their point of juncture, and a perforated diaphragm disk extending across the receiver at its point of junction with the bearing head and provided with a thickened marginal portion held in said receiving channel.

6. In a milking apparatus, a teat cup comprising a tubular inclosure for the teat having an outwardly extending marginal flange, an annular udder supporting member of greater diameter than said tubular closure and having an inwardly bent portion extending under said peripheral flange of the inclosure and forming a receiving channel, and a perforated diaphragm supported by the marginal flange of the tubular inclosure and having a marginal portion underlying said flange and clamped between the same and the inwardly extending portion of the bearing member.

7. In a milking apparatus, a teat cup comprising a tubular inclosure for the teat provided with an out-turned marginal flange, an udder support of greater diameter than said tubular inclosure and having a sleeve embracing the same and an inwardly extending portion projecting beneath said marginal flange and forming a receiving channel, and a perforate diaphragm comprising a disk seated upon said marginal flange and having a depending flange projecting downwardly into said channel and terminating in a thickened rim clamped within said channel.

8. In a milking apparatus, a tubular receiver for the teat, a head member both longitudinally and revolubly adjustable in relation with the receiver, a projection on one of the members and a spiral bearing on the other member engaged by the projection whereby a rotary movement of one member will cause a simultaneous longitudinal adjustment of the parts.

In testimony whereof I have hereunto set my hand this 8th day of October, 1914.

CARLOS DE LEON.

Witnesses:
R. M. MILLER,
CARRIE M. RECKER.

Copies of this patent may be obtained for five cents each, by addressing the "Commissioner of Patents, Washington, D. C."